United States Patent
Höller et al.

(10) Patent No.: US 12,345,817 B2
(45) Date of Patent: Jul. 1, 2025

(54) METHOD FOR OPERATING A LIDAR SYSTEM

(71) Applicant: Carl Zeiss AG, Oberkochen (DE)

(72) Inventors: Frank Höller, Aalen (DE); Thomas Wollweber, Eckartsberga (DE); Jan Horn, Munich (DE); Peter Westphal, Jena (DE)

(73) Assignee: Carl Zeiss AG, Oberkochen (DE)

( * ) Notice: Subject to any disclaimer, the term of this patent is extended or adjusted under 35 U.S.C. 154(b) by 1231 days.

(21) Appl. No.: 17/125,574

(22) Filed: Dec. 17, 2020

(65) Prior Publication Data
US 2021/0190951 A1    Jun. 24, 2021

(30) Foreign Application Priority Data
Dec. 20, 2019    (DE) ...................... 10 2019 135 570.2

(51) Int. Cl.
*G01S 17/32*    (2020.01)
*B60Q 1/00*    (2006.01)
(Continued)

(52) U.S. Cl.
CPC ............ *G01S 17/32* (2013.01); *B60Q 1/0023* (2013.01); *B60Q 1/0408* (2013.01); *G01S 7/4817* (2013.01); *G01S 17/931* (2020.01)

(58) Field of Classification Search
None
See application file for complete search history.

(56) References Cited

U.S. PATENT DOCUMENTS 6,124,823 A * 9/2000 Tokoro ................. G01S 13/931
342/128
7,271,880 B2 9/2007 Samukawa et al.
(Continued)

FOREIGN PATENT DOCUMENTS

DE    102004028860 A1    1/2005
DE    102005054497 A1    5/2007
WO    WO 2019/064062 A1    4/2019

OTHER PUBLICATIONS

Carl Zeiss AG, European Office Action, EP Patent Application No. 20212617.3, May 14, 2024, 7 pgs.
(Continued)

*Primary Examiner* — Yuqing Xiao
*Assistant Examiner* — Jempson Noel
(74) *Attorney, Agent, or Firm* — Morgan, Lewis & Bockius LLP (57) ABSTRACT

A method for operating a LIDAR system with at least one spectrally tunable light source emitting a light beam having a temporally varying frequency and a transparent protective shield, arranged in a light path of the light beam, protecting the LIDAR system against environmental pollution includes determining distance values of an object based on beat frequencies of beat signals resulting from a superposition of partial signals obtained from partial reflection of the light beam at the object with reference signals not reflected at the object. Each distance value is determined from a peak in a signal spectrum obtained on the basis of a Fourier transformation of the beat signal. A degree of soiling of the protective shield is diagnosed by analyzing the signal spectrum in a predefined analysis frequency range. An upper limit frequency bounding said analysis frequency range is based on a distance of the protective shield.

21 Claims, 5 Drawing Sheets

(51) Int. Cl.
   *B60Q 1/04*     (2006.01)
   *G01S 7/481*    (2006.01)
   *G01S 17/931*   (2020.01)

(56)         References Cited

U.S. PATENT DOCUMENTS

| | | | |
|---|---|---|---|
| 7,737,882 B2* | 6/2010 | Matsuoka | G01S 7/4004 |
| | | | 342/70 |
| 8,836,572 B2* | 9/2014 | Heilmann | G01S 13/931 |
| | | | 342/91 |
| 10,340,651 B1 | 7/2019 | Drummer et al. | |
| 2004/0257556 A1 | 12/2004 | Samukawa et al. | |
| 2007/0040727 A1 | 2/2007 | Matsuoka | |
| 2015/0177367 A1 | 6/2015 | Sebastian et al. | |
| 2017/0038459 A1* | 2/2017 | Kubacki | G01S 17/36 |
| 2018/0024246 A1 | 1/2018 | Jeong et al. | |
| 2018/0046183 A1* | 2/2018 | Peters | B60W 50/0225 |
| 2018/0188362 A1 | 7/2018 | Fujita | |
| 2018/0284226 A1* | 10/2018 | LaChapelle | G01S 17/10 |
| 2020/0232895 A1* | 7/2020 | Herman | B60S 1/0818 |

OTHER PUBLICATIONS

European Search Report, dated May 6, 2021, Application No. 20212617.3, Carl Zeiss AG, 8 pgs.
Zeiss, German Office Action, German Application No. 10 2019 135 570.2, Aug. 14, 2020, 12 pgs.
Carl Zeiss AG, German Office Action, DE Patent Application No. 102019135570.2, Sep. 6, 2024, 6 pgs.

* cited by examiner

METHOD FOR OPERATING A LIDAR SYSTEM

CROSS-REFERENCE TO RELATED APPLICATIONS

The present application claims benefit of German patent application 10 2019 135 570.2 filed on Dec. 20, 2019. The entire disclosure of this earlier patent application is incorporated herein by reference.

BACKGROUND OF THE INVENTION

Field of the Invention

The invention relates to a method for operating a LIDAR system. The LIDAR system can be used for determining distances both of moving objects and of stationary objects and, in particular, for determining the topography or shape of a spatially extended three-dimensional object.

Prior Art

For the purposes of measuring the distance of objects by optical means, a measurement principle also referred to as LIDAR is known in which an optical signal is emitted to the relevant object and evaluated after back-reflection has taken place at the object. In practice, use is made both of time-of-flight-based measurement systems (TOF-LIDAR measurement systems, TOF=time of flight), in which the time of flight of the laser light to the respective object and back is measured directly, and FMCW-LIDAR measurement systems using a frequency-modulated FMCW laser (FMCW="frequency-modulated continuous wave").

One problem that occurs in practice is that a LIDAR system is exposed to considerable environmental pollution depending on the use scenario. In the case of application in road traffic, for example, the LIDAR system can be protected as such against environmental pollution by a front shield that is sufficiently transparent to the operating wavelength (e.g. a headlight lens in the case of accommodation in the headlight). However, soiling or damage of said front shield itself as a result of dirt particles or stone chips or as a result of precipitation such as rain, snow or ice can occur with the consequence that a correct signal detection and a reliable determination of the distance of objects are no longer provided. If applicable, in phases in which no reflected measurement signal is detected by the LIDAR apparatus, it is not possible to distinguish whether this is attributable to the absence of objects to be measured with regard to their distance, or else to soiling of the front shield.

Corresponding remedial measures e.g. in the form of cleaning or defrosting processes are generally accompanied by an impairment of the actual functionality of the LIDAR system and therefore typically require an interruption of the operation of the LIDAR system.

Possible approaches for continuous monitoring—which is also desirable with regard to minimizing such interruptions of operation—of the degree of soiling of the abovementioned front shield, for instance, include the use of additional suitable sensors (e.g. in the form of rain sensors or camera-based sensors), but are associated with an increase in the equipment outlay. Moreover, there is the risk, in principle, of disturbances or defects occurring on such additional sensors themselves, with the consequence that e.g. a cleaning process will not be initiated in a timely manner.

SUMMARY OF THE INVENTION

Against the background above, it is an object of the present invention to provide a method for operating a LIDAR system which enable early identification and optionally elimination of soiling functional disturbances with lower equipment outlay.

In an aspect of the invention, this object is achieved by a method for operating a LIDAR system comprising at least one spectrally tunable light source that emits a light beam having a temporally varying frequency. A transparent protective shield, which is arranged in a light path of the light beam, protects the LIDAR system against environmental pollution. The method comprises the step of determining distance values of the object on the basis of beat frequencies of beat signals resulting from a superposition of partial signals. The latter are obtained from partial reflection of the light beam at the object with reference signals not reflected at the object. Each distance value is determined from a peak in a signal spectrum obtained on the basis of a Fourier transformation of the beat signal. A degree of soiling of the protective shield is diagnosed by analyzing the signal spectrum in a predefined analysis frequency range. An upper limit frequency bounding said analysis frequency range is based on a distance of the protective shield.

In accordance with an embodiment, the upper limit frequency bounding the analysis frequency range is not greater than 2 MHz, in particular not greater than 1 MHz. In this case, the upper limit frequency bounding the analysis frequency range can be chosen in particular depending on the geometry given in the respective application, in particular the smallest possible object distance dictated by the geometry. Furthermore, the analysis frequency range can be predefined e.g. by the distance of a (front or protective) shield that for instance protects the LIDAR system against environmental pollution and that is sufficiently transparent to the operating wavelength.

The present invention is based on the concept, in particular, in the case of distance determination in an FMCW-LIDAR system using a frequency-modulated FMCW laser (FMCW="frequency-modulated continuous wave"), of carrying out an automatic modification of the operation of the LIDAR system (for instance by way of implementing or planning a cleaning or defrosting measure) depending on an analysis of the signal spectrum itself that is obtained on the basis of a Fourier transformation of the beat signal.

In this case, the invention proceeds from the consideration that the position and the distance e.g. of the abovementioned front shield or some other component present e.g. for protecting the LIDAR system are known, wherein in addition this distance is small in comparison with typical object distances to be detected. Particles such as e.g. dirt particles or precipitation present on said component or front shield can thus likewise be verified, in principle, as a peak in said signal spectrum.

Proceeding from this consideration, the invention then includes the concept, in particular, by way of analysis of the signal spectrum in a specific frequency range (typically with comparatively low frequencies of the order of magnitude of 1 MHz), of carrying out a diagnosis of the degree of soiling (or degree of icing, etc.) and, depending on this analysis, of automatically initiating corresponding remedial measures and/or an interruption of the operation of the LIDAR system. The invention here also makes use of the circumstance, in particular, that a plurality of distances or object distances can be determined simultaneously by means of an FMCW-LIDAR measurement system since each of these distances respectively corresponds to a dedicated peak in the signal spectrum obtained from a Fourier transformation of the beat signal.

Merely by way of example, for instance, the distance between a front or protective shield and the scanner of the LIDAR system may be of the order of magnitude of 10 cm. If it is further assumed that an object distance of 150 m corresponds to a beat frequency of 1 GHz, typical beat frequencies corresponding to the distance of the front shield or dirt particles situated thereon are of the order of magnitude of (1-2) MHz, such that the frequency range of the signal spectrum that is to be analyzed for the diagnosis of the degree of soiling (as analysis range) can be differentiated from the actual "search range" (i.e. the frequency range of the signal spectrum that is relevant to the actual measurement of the distance of objects) or can be separated therefrom during the evaluation.

By virtue of the fact that the signal spectrum that is to be determined anyway by Fourier transformation of the beat signal is used for the analysis according to the invention e.g. of the degree of soiling or the automatic initiation of suitable remedial measures, in particular the use of additional (soiling or icing) sensors can be dispensed with (and the costs associated with such use can be avoided).

However, the invention is not restricted to dispensing with the use of such sensors. In particular, the method according to the invention can also be realized in order to create additional redundancy in a LIDAR system already equipped with one or more sensors.

Furthermore, the invention is not restricted to the presence of a protective shield or to the use of such a protective shield for the method according to the invention. In this regard, it is also possible to utilize e.g. auxiliary surfaces (which can in turn be situated in proximity to a protective shield optionally present). Furthermore, in the context of the method according to the invention, it is also possible to utilize the effect of total internal reflection disturbed by surface wetting (e.g. on account of rain precipitation) given a suitable angle of incidence (wherein this effect can also be used to differentiate between rain precipitation and soiling).

In accordance with one embodiment, the step of analyzing comprises ascertaining the height of at least one peak in the predefined frequency range.

In accordance with one embodiment, the step of analyzing comprises ascertaining the total energy in the predefined frequency range of the signal spectrum.

In accordance with one embodiment, the step of analyzing comprises determining a temporal fluctuation in the predefined frequency range of the signal spectrum.

In accordance with one embodiment, the step of modifying operation of the LIDAR system comprises implementing or planning a cleaning or defrosting measure.

In accordance with one embodiment, the cleaning or defrosting measure is implemented on a shield that is transparent to the light beam emitted by the spectrally tunable light source.

In accordance with one embodiment, the cleaning or defrosting measure to be implemented is selected depending on the temporal fluctuation determined.

In accordance with one embodiment, the step of modifying operation of the LIDAR system comprises temporarily interrupting the operation of the light source and/or the distance determination.

The invention is explained in greater detail below on the basis of exemplary embodiments illustrated in the accompanying figures.

BRIEF DESCRIPTION OF THE DRAWINGS

Further features and advantages of the invention will become apparent from the following description of exemplary embodiments with reference to the drawings, in which.

DETAILED DESCRIPTION OF EMBODIMENTS

Figure 4A:
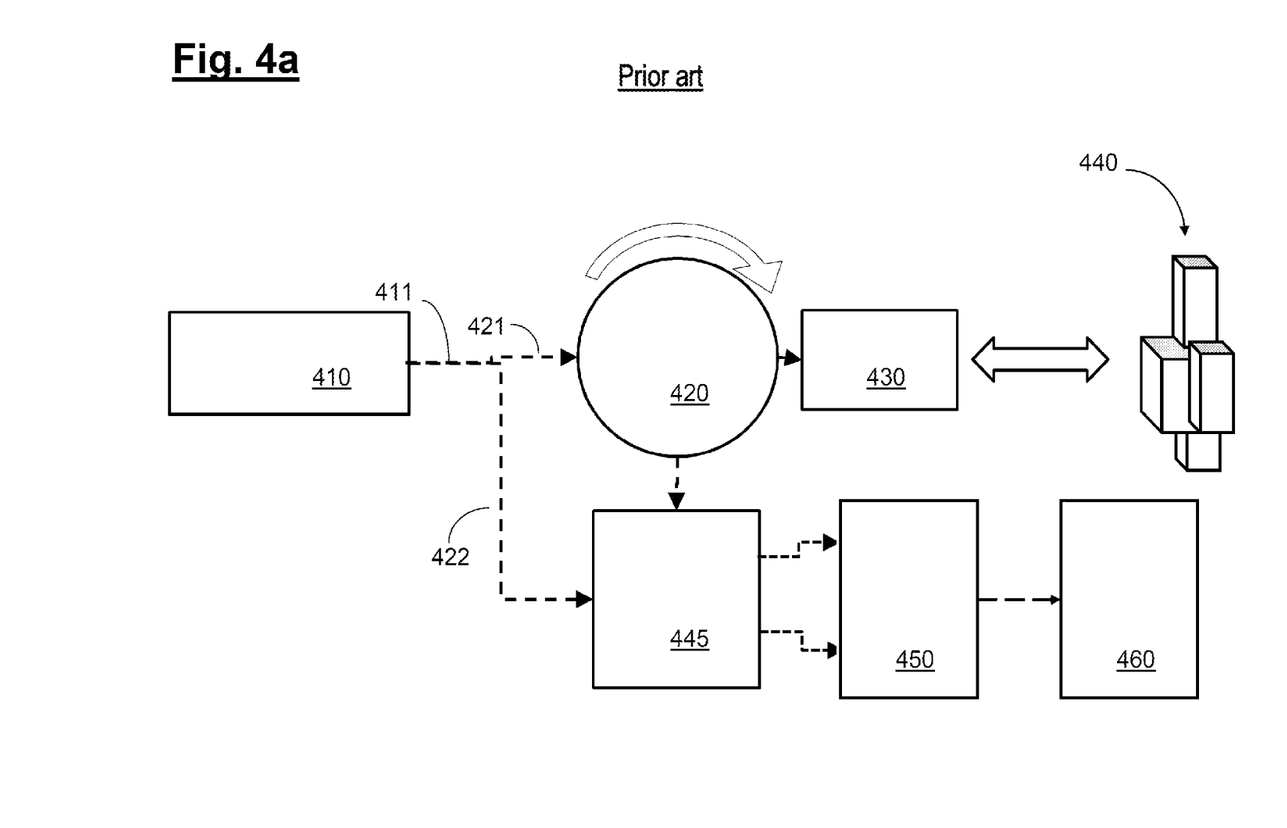
FIGS. 4*a*-4*b* show further schematic illustrations for explaining the set-up and manner of operation of a LIDAR system for distance determination in which the method according to the invention can be realized.

FIG. 4*a* firstly shows, merely in a schematic illustration, a basic set-up, known per se, in which a signal 411 with temporally varied frequency (also referred to as "chirp"), emitted by a spectrally tunable light source 410, is split into two partial signals, this splitting being implemented, for example, by way of a beam splitter (e.g., a partly transmissive mirror or a fiber-optic splitter) that is not illustrated. The two partial signals are coupled by way of a signal coupler 445 and superposed at a detector 450, with the first partial signal, as a reference signal 422, reaching the signal coupler 445 and the detector 450 without a reflection at the object denoted by "440". By contrast, the second partial signal arriving at the signal coupler 445 or at the detector 450, as a measurement signal 421, propagates to the object 440 via an optical circulator 420 and a scanner 430, is reflected back by said object and consequently arrives at the signal coupler 445 and the detector 450 with a time delay and a correspondingly altered frequency in comparison with the reference signal 422.

Figure 4B:
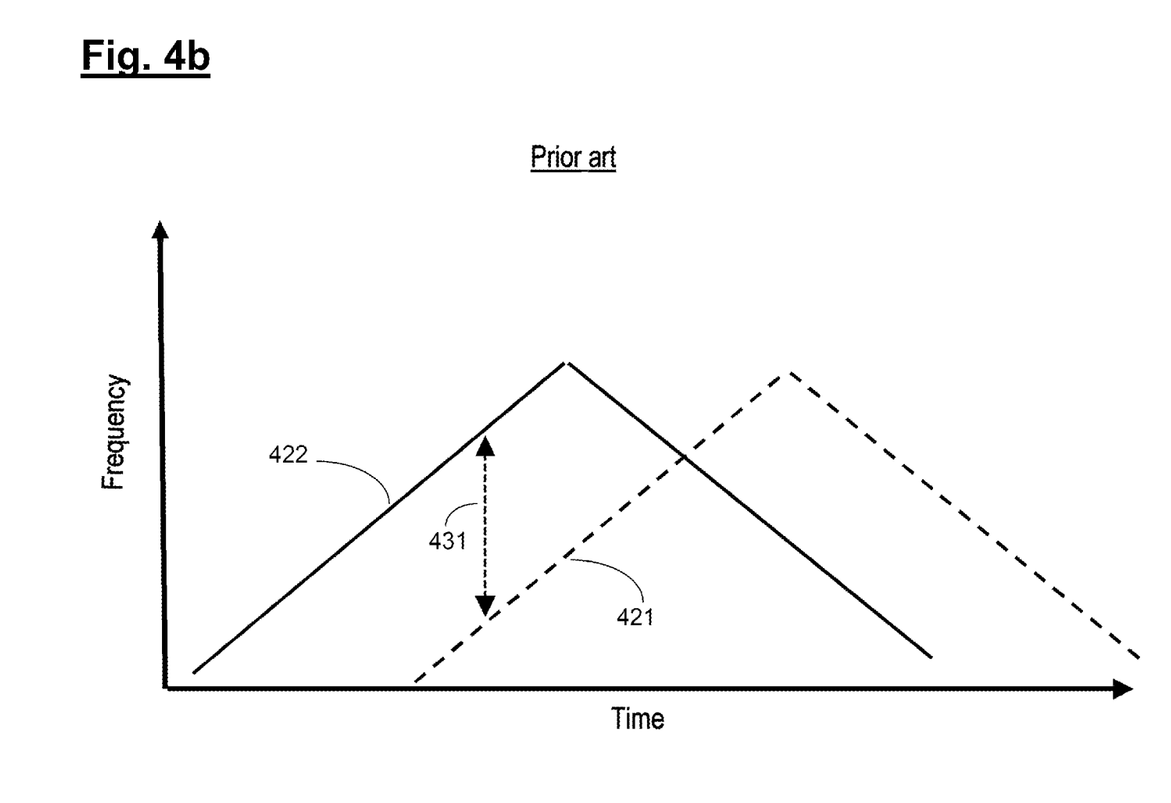

The detector signal supplied by the detector 450 is evaluated by means of an evaluation device 460, wherein the difference frequency 431 between measurement signal 421 and reference signal 422, said difference frequency being detected at a specific point in time and being illustrated in the diagram in FIG. 4*b*, is characteristic of the distance between the object 440 and the measuring apparatus or the light source 410. In accordance with FIG. 4*b*, in this case, in order to obtain additional information with regard to the relative speed between the object 440 and the measuring apparatus or the light source 410, the time-dependent frequency profile of the signal 411 emitted by the light source 410 can also be constituted such that there are two segments in which the time derivatives of the frequency generated by the light source 410 are opposite to one another.

If the light emanating from the light source 410 is split into a reference signal 422 and a measurement signal 421 which interfere at the detector 450, a distance-dependent beat signal arises, the frequency of which can be determined from the chirp rate K. Given a distance d, the following holds true for the beat frequency:

$$f_{beat}(d) = 2 * \kappa * d/c \tag{1}$$

wherein κ denotes the chirp rate of the frequency tuning and c denotes the speed of light.

If the interference of a plurality of signals from different distances then occurs simultaneously at the detector 450, a plurality of beat frequencies arise, which can be unambiguously ascertained by means of a Fourier transformation of the beat signal.

It is assumed hereinafter that the LIDAR system described above with reference to FIG. 4a is protected against environmental influences by means of a front or protective shield or the like (e.g. a headlight lens in the case where the LIDAR system is accommodated in the housing of a vehicle headlight).

For monitoring and optionally eliminating contaminants such as weather-dictated precipitation, etc., situated on said protective shield, the invention makes use, then, of the circumstance that corresponding (dirt or precipitation) particles on the front or protective shield can also be regarded as objects, in principle, which for their part are verifiable in the form of a peak in the signal spectrum obtained on the basis of a Fourier transformation of the beat signal.

If it is furthermore taken into consideration that the corresponding peak caused by said particles occurs in a frequency range of the signal spectrum whose frequencies are significantly (e.g. by two to three orders of magnitude) lower than the frequencies corresponding to typical object distances to be determined in road traffic, according to the invention the desired soiling diagnosis can then be effected by way of an analysis of the signal spectrum in the relevant range of low frequencies (referred to hereinafter as "analysis range soiling").

Figure 1:
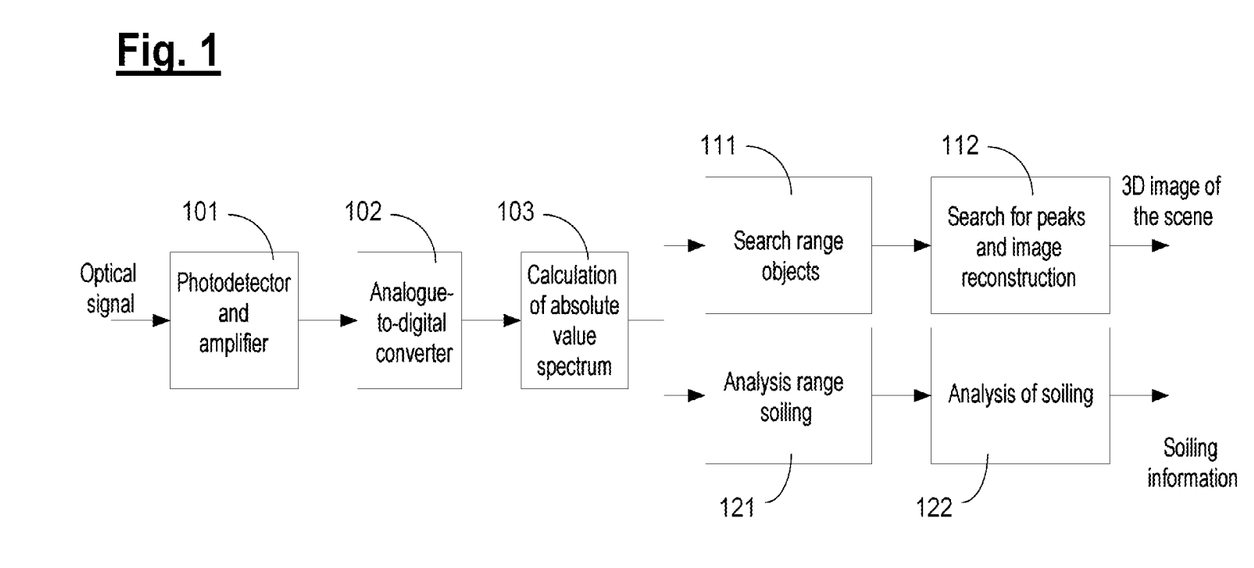
FIG. 1 shows a schematic illustration for explaining a possible basic sequence of a method according to the invention.

FIG. 1 shows a merely schematic illustration for elucidating the principle. In accordance with FIG. 1, the superposition signal generated from measurement signal and reference signal as described above with reference to FIG. 4a passes firstly into a detector and amplifier unit, designated by "101", and then into an analog-to-digital converter 102. From the beat signal generated by said analog-to-digital converter 102, a signal spectrum is calculated on the basis of a Fourier transformation in a manner known per se (block 103).

Figure 2A:
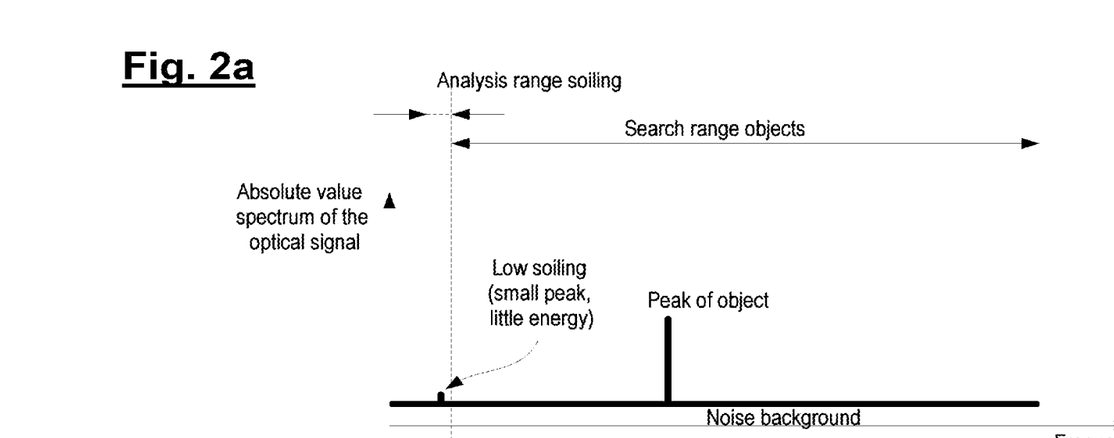
FIGS. 2*a*-2*b* show diagrams for further elucidation of the method according to the invention.
Figure 2B:
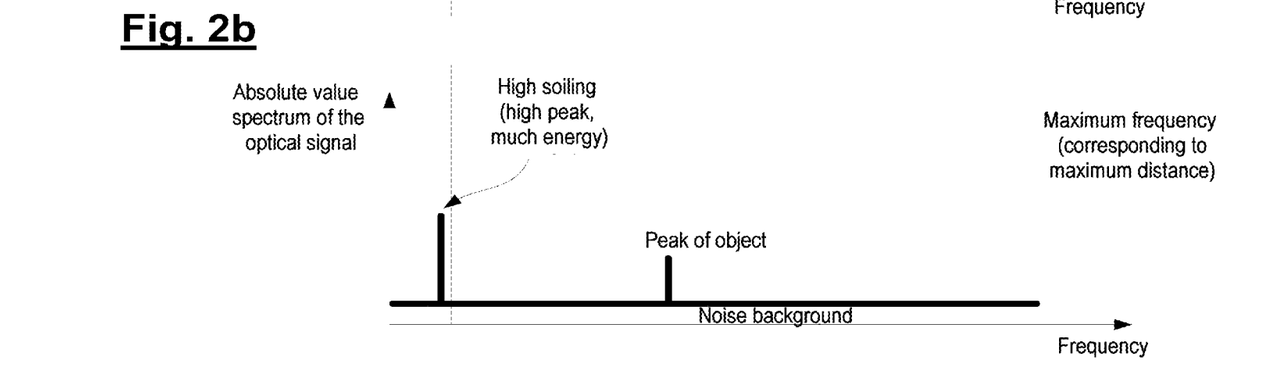

In said signal spectrum, then—as additionally illustrated in FIG. 2a and FIG. 2b—a "search range objects" 111 is differentiated from an "analysis range soiling" 121. In this case, an upper limit frequency bounding the analysis frequency range is less than the maximum frequency that occurs in the signal spectrum evaluated by the evaluation device for determining distance values of the object. In embodiments, e.g. the upper limit frequency bounding the analysis frequency range can be chosen to be not greater than 2 MHz, in particular not greater than 1 MHz. In other words, the "analysis range soiling" 121 indicated in FIG. 2a can be chosen merely by way of example such that it encompasses only frequencies up to a maximum frequency of 2 MHz, in particular up to a maximum frequency of 1 MHz.

Furthermore, the "analysis range soiling" 121, just like the "search range objects" 111, can be chosen in each case depending on the current beam direction, which makes it possible to take account of the circumstance that the outgoing measurement beam covers different distances to the front or protective shield depending on the beam or scanning direction.

The analysis of the signal spectrum within the "analysis range soiling" mentioned above can comprise, in particular, ascertaining the height of a peak detected in this frequency range. In this case, it is assumed that the peak height is proportional to the scattered light component and proportional to the degree of soiling. FIG. 2a shows, in an exaggerated illustration not true to scale, exemplary scenarios of comparatively low soiling (FIG. 2a) and comparatively high soiling (FIG. 2b). As the degree of soiling increases, the peak that is to be assigned to the object to be measured with regard to its distance becomes smaller and the soiling-dictated peak occurring in the low-frequency "analysis range soiling" becomes larger. It is assumed here that the beam is comparatively large in relation to soiling that occurs (where a typical diameter of the beam can be 15 mm, for example) and the (front or protective) shield is arranged in proximity to the exit pupil. In this case, a higher degree of soiling results in a higher peak.

Alternatively or additionally, it is also possible to ascertain the total energy in the aforesaid frequency range of the signal spectrum (e.g. by integrating the squared signal level over the corresponding frequency range).

In further embodiments, additionally or alternatively, the temporal fluctuation of the peak intensity can also be evaluated. Since said temporal fluctuation of the peak intensity is significantly greater for instance in the case of rain or snow situated on the front or protective shield by comparison with the accumulation of dirt particles on the front or protective shield, by determining the temporal fluctuation of the peak intensity it is possible to differentiate between rain or snow, on the one hand, and soiling, on the other hand.

As soon as the degree of soiling determined as described above exceeds a specific measure, operation of the LIDAR system is automatically modified according to the invention. This can comprise the initiation of suitable remedial measures (e.g. cleaning with high-pressure water in order to eliminate dirt particles or heating in order to eliminate snow or ice) and/or a temporary shutdown or interruption of the operation of the LIDAR system.

If the (front or protective) shield is relatively far away from the exit pupil (e.g. at a distance of more than 100 mm given a diameter of the beam of 15 mm, for example), it is possible furthermore also to identify an angle range in which a sufficient signal is not to be expected or where measurement cannot reliably take place. The aforesaid angle range can be ascertained more accurately in the case of smaller beam diameters.

Depending on the degree of soiling, such remedial measures or interruptions of the operation of the LIDAR system can be effected immediately or as well (e.g. the next time the vehicle is stopped), optionally also preventively.

Said protective shield of the LIDAR system should preferably be designed in such a way that over the entire scanning range the measurement signal is not directly reflected into the detector or the receiver channel and only scattered light emanating from the dirt particles or the precipitation is detected.

Figure 3:
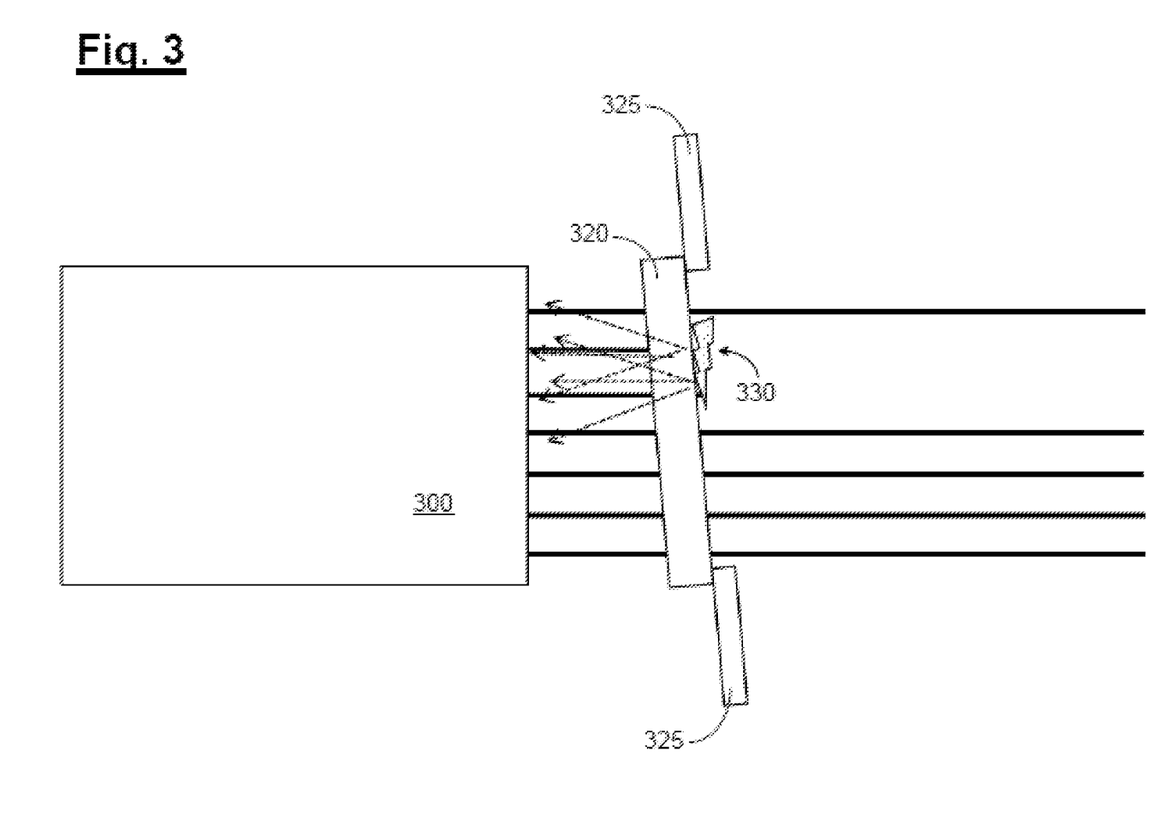
FIG. 3 shows a schematic illustration for explaining a possible set-up with which the method according to the invention can be realized.

FIG. 3 shows a merely schematic and greatly simplified illustration for explaining a possible set-up with which the method according to the invention can be realized. In this case, "300" denotes a LIDAR system, "320" denotes a (protective) shield that is transparent to light emitted by the light source of the LIDAR system 300, and "325" denotes a mechanical mount of said shield 320. FIG. 3 likewise indicates particles (e.g. dirt particles or precipitation) situated on the shield 320, said particles being designated by "330", and various exemplary directions (each indicated by dashed arrows) of the scattered light emanating from said particles.

As indicated in FIG. 3, what can be achieved by means of a suitable geometry or an inclination of the shield 320 relative to the LIDAR system 300 is that only scattered light, but not the direct (specular) reflection of the measurement signal, enters the detector or the receiver channel of the LIDAR system. In further embodiments, however, a direct reflection occurring can also be accepted and optionally utilized for functional monitoring of the LIDAR system or the scanning process (since the direct reflection can only be observed during scanning operation, in contrast to a peak on account of scattered light). Furthermore, by means of a suitable coating e.g. of a front or protective shield, it is also possible to optimize the signal strength of the direct reflection with regard to the detector.

Even though the invention has been described on the basis of specific embodiments, numerous variations and alternative embodiments will be apparent to the person skilled in the art, for example through combination and/or exchange of features of individual embodiments. Accordingly, it goes without saying for the person skilled in the art that such variations and alternative embodiments are concomitantly encompassed by the present invention, and the scope of the invention is restricted only within the meaning of the appended patent claims and the equivalents thereof.

The invention claimed is:

1. A method for operating a LIDAR system configured to determine a distance of an object in a scanning fashion, wherein the LIDAR system comprises:
    at least one spectrally tunable light source configured to emit at least one light beam having a temporally varying frequency, and
    a protective shield configured to protect the LIDAR system against environmental pollution, wherein the protective shield is arranged in a light path of the at least one light beam and is transparent for the at least one light beam,
    wherein the method comprises the following steps:
        a) determining distance values of the object on the basis of beat frequencies of beat signals resulting from a superposition of partial signals, which are obtained from partial reflection of the at least one light beam at the object, with reference signals not reflected at the object, wherein each distance value is determined from a peak in a signal spectrum obtained on the basis of a Fourier transformation of the beat signal;
        b) diagnosing a degree of soiling of the protective shield by analyzing the signal spectrum in a predefined analysis frequency range that corresponds to a distance of the protective shield, wherein the predefined analysis frequency range is distinct from a frequency range associated with determining the distance of the object; and
        c) automatically modifying an operation of the LIDAR system depending on the diagnosed degree of soiling of the protective shield.

2. The method of claim 1, wherein the predefined analysis frequency range is not greater than 2 MHz.

3. The method of claim 1, wherein step b) comprises the step of determining a height of at least one peak in the predefined analysis frequency range.

4. The method of claim 1, wherein step b) comprises the step of determining a total energy in the predefined analysis frequency range.

5. The method of claim 1, wherein step b) comprises the step of determining a temporal fluctuation in the predefined analysis frequency range.

6. The method of claim 1, wherein step c) comprises the step of implementing or planning a cleaning or defrosting measure.

7. The method of claim 6, wherein the cleaning or defrosting measure is implemented on the protective shield.

8. The method of claim 6, wherein step c) comprises the step of determining a temporal fluctuation in the predefined analysis frequency range, and wherein the cleaning or defrosting measure is selected depending on the temporal fluctuation.

9. The method of claim 1, wherein step c) comprises the step of temporarily interrupting an operation of the light source.

10. The method of claim 1, wherein the protective shield is part of a housing of a vehicle headlight.

11. The method of claim 1, wherein step c) comprises the step of temporarily interrupting a determination of distance values according to step a).

12. A method for operating a LIDAR system configured to determine a distance of an object, comprising the following steps:
    a) emitting a light beam having a temporally varying frequency;
    b) directing the light beam on a protective shield that protects the LIDAR system against environmental pollution and is transparent for the light beam,
    c) determining distance values of the object on the basis of beat frequencies of beat signals resulting from a superposition of partial signals, which are obtained from partial reflection of the light beam at the object, with reference signals not reflected at the object, wherein each distance value is determined from a peak in a signal spectrum obtained on the basis of a Fourier transformation of the beat signal;
    d) diagnosing a degree of soiling of the protective shield by analyzing the signal spectrum in an analysis frequency range, wherein an upper limit frequency bounding the analysis frequency range is not greater than 2 MHz and the analysis frequency range is distinct from a frequency range associated with determining the distance of the object; and
    e) automatically modifying an operation of the LIDAR system depending on the diagnosed degree of soiling of the protective shield.

13. The method of claim 12, wherein step d) comprises the step of determining a total energy in the analysis frequency range.

14. The method of claim 12, wherein step d) comprises the step of determining a temporal fluctuation in the analysis frequency range.

15. The method of claim 12, wherein step e) comprises the step of implementing or planning a cleaning or defrosting measure.

16. The method of claim 15, wherein the cleaning or defrosting measure is implemented on the protective shield.

17. The method of claim 15, wherein step d) comprises the step of determining a temporal fluctuation in the analysis frequency range, and wherein the cleaning or defrosting measure is selected depending on the temporal fluctuation.

18. The method of claim 12, wherein step e) comprises the step of temporarily interrupting an operation of a light source that emits the light beam.

19. The method of claim 12, wherein the protective shield is part of a housing of a vehicle headlight.

20. The method of claim 12, wherein step e) comprises the step of temporarily interrupting a determination of distance values according to step c).

21. The method of claim 12, wherein step d) comprises the step of determining a height of at least one peak in the analysis frequency range.

* * * * *